United States Patent Office 2,740,468
Patented Apr. 3, 1956

2,740,468
SEAT HAVING ADJUSTABLE DEFLECTION RATE

August T. Gonia, Chicago, and Harry H. Fante, Hinsdale, Ill., assignors to Rockwell Spring and Axle Company, Coraopolis, Pa., a corporation of Pennsylvania Application April 22, 1954, Serial No. 424,906

3 Claims. (Cl. 155—179)

This invention relates to a seat in which the rate of deflection can be adjusted to suit the needs of a user and particularly to such a seat for use in a motor vehicle.

All resilient seats, whether they comprise cushion springs, leaf springs, coil springs, or still other types of springs, have a common measurement called rate of deflection. This measurement indicates the amount of deflection the seat undergoes per unit weight applied on the seat. For instance, a seat having a deflection rate of 60 pounds per inch deflects an inch for every 60 pounds of weight applied.

Resilient seats commonly used at present provide a fixed deflection rate. As a result many users object to a lack of comfort which arises not only from a difference in the weights of various users and therefore a difference in deflections in the seat, but also from a difference in personal preferences as to the degree of softness desired. Ordinarily, a relatively light person wishes a seat that is soft, while a heavier person prefers a firmer or stiffer seat. The differences between a soft and stiff seat are peculiarly accentuated in a motor vehicle since the seat sensitively reflects the riding qualities of the vehicle. Moreover, seats lacking the desired softness or firmness induce fatigue on long drives or during long seating intervals in the vehicle.

The present invention provides a seat in which the rate of deflection can be most readily adjusted to suit the needs of the user. In one form, our seat includes resilient means supported on a frame and comprising a vertically disposed V-shaped spring more commonly referred to in the art as a spring of the alligator jaw type. By varying the angle between the legs of the V-shaped spring, the lever arm of the spring is adjusted which, in turn, regulates the deflection rate of the resilient means.

The accompanying drawings illustrate a presently preferred embodiment wherein.

Figure 1:
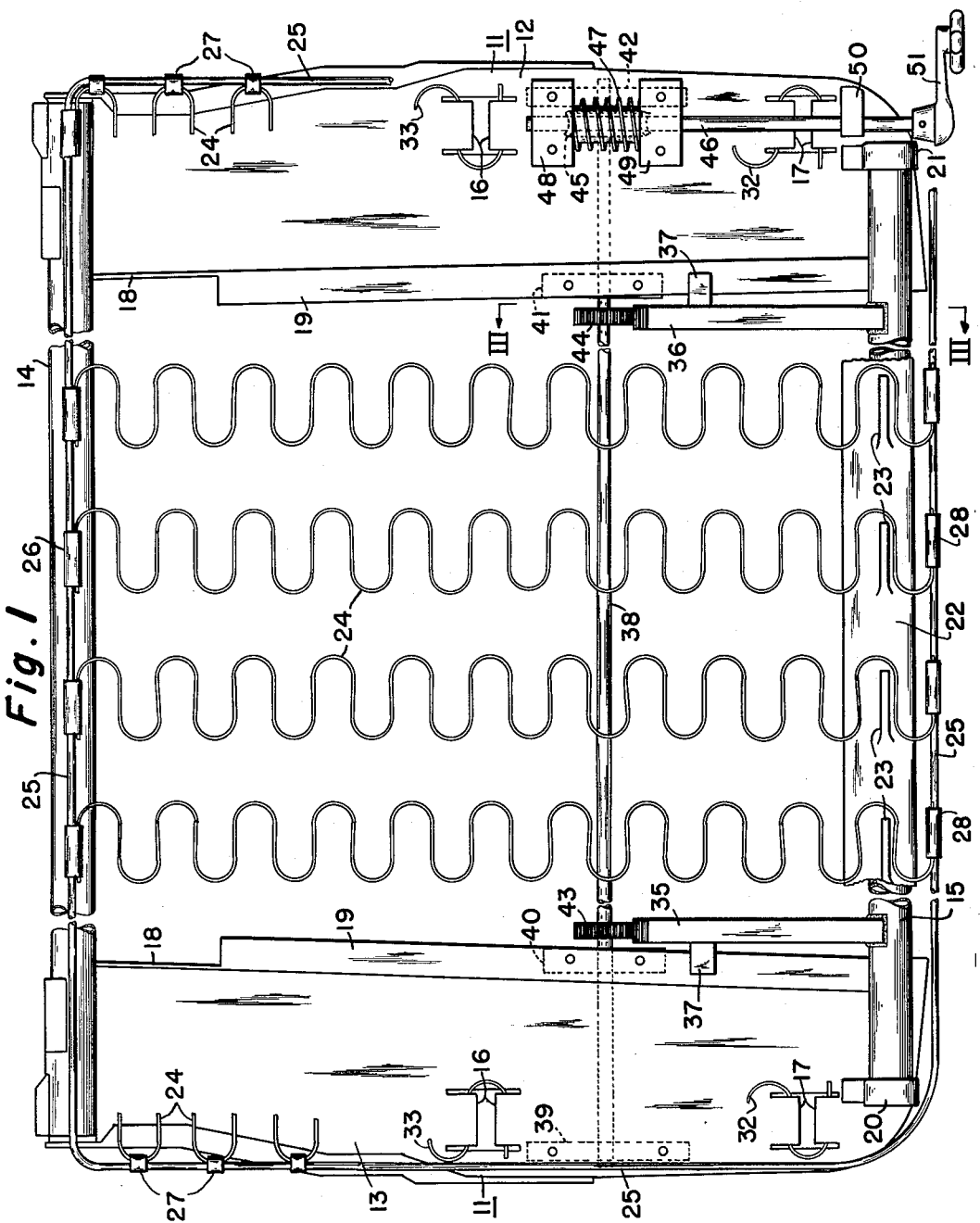
Figure 1 is a plan view of a seat having an adjustable deflection rate some parts being broken away for purposes of illustration.

Referring to the drawings, the seat includes a base 10 which carries a frame generally shown at 11. The frame comprises side plates 12 and 13, a tubular rod 14 connecting the plates at the rear of the seat, and a tubular rod 15 similarly connecting the plates at the front. Each plate has upstanding lugs 16 and 17 struck therefrom and a wall portion 18 having an outwardly turned flange 19. Rod 15 is journaled for rotation about its axis in bearings 20 and 21 carried by the plates and has a fixed strip 22 which carries upstanding sleeves 23.

The frame 11 supports suitable resilient means which in the embodiment shown includes sinuous-shaped springs 24. A border wire 25 extends around the periphery of the frame and is joined to the tubular rod 14 by clips 26 which, for example, may be welded to the rod. For purposes of illustrating other parts, just the top springs 24 of the resilient means are shown in Figure 1 and only some of these, it being understood that there are a sufficient number of springs 24 juxtaposed to extend from one side of the seat to the other. Clips 27 fix the loops of the springs 24 at the sides of the seat to the border wire 25, and clips 28 fix the ends of all of the sinuous-shaped springs 24 to the border wire at the front of the seat.

Figure 2:
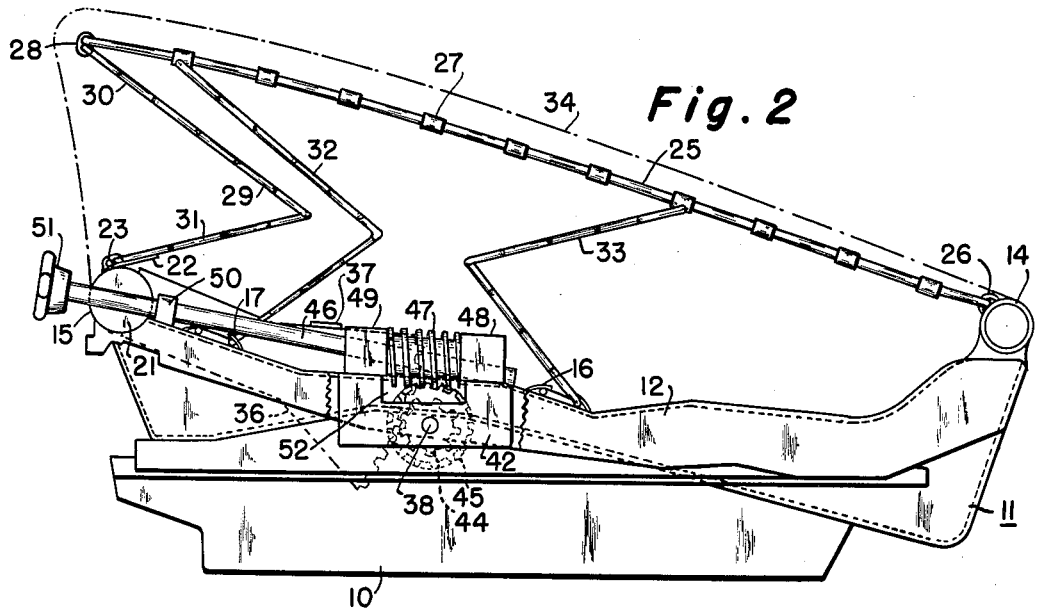
Figure 2 is an end view of the seat of Figure 1 showing the use of V-shaped springs.
Figure 3:
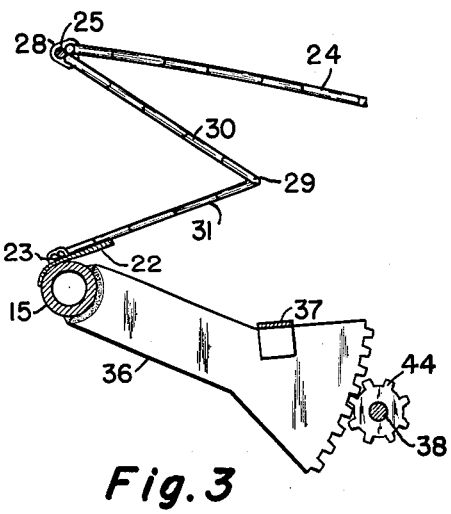
Figure 3 is a section of Figure 1 on the line III—III.

Figure 2 illustrates the other parts of the resilient means by which the springs 24 are resiliently supported on the frame 11. A vertically disposed V-shaped spring 29, referred to in the art as an alligator jaw type of spring, joins each of the springs 24 to the tubular rod 15. Springs 29 may also be sinuous-shaped like springs 24. A loop at the end of a leg 30 of each spring 29 may therefore be clipped to the border wire 25 in a manner which preferably allows some individual movement by the leg 30. Slotted sleeve clips which overlap around the wires may be used for this purpose. Preferably, the spring 24, border wire 25, and leg 30 are fastened together by the same clip. The loop at the end of a leg 31 of each spring 29 is inserted in a sleeve 23 on the strip 22. If desired, additional V-shaped springs 32 and 33 may be used to supplement the supporting action of the springs 29. Springs 32 and 33 may also be sinuous-shaped and are clipped at the sides of the seat to the border wire 25 or to the end rows of the springs 24 or to both. The lower end of spring 32 is anchored to the frame 11 by the lugs 17, while the lower end of spring 33 is anchored by lugs 16. When the seat is suitably upholstered, it may have a general outline as shown by the line 34 in Figure 2.

To adjust the rate of deflection of the seat, the effective lever arm of the springs 29 is changed. This is accomplished by rotating the rod 15. Fan gears 35 and 36 are fixed to the rod 15 and project inwardly of the seat. Fingers 37 on the fan gears act as stops by striking against the flanges 19 of the plates 12 and 13. A shaft 38 is journaled for rotation beneath the plates in bearings 39, 40, 41, and 42. Bearings 39 and 42 are fixed to the plates adjacent the sides, while bearings 40 and 41 are secured to the undersides of the flanges 19. Shaft 38 has gears 43 and 44 to engage the fan gears and a worm gear 45. A shaft 46 carrying a worm 47 extends substantially at right angles to the shaft 38 and beyond the frame 11 at the front of the seat. Bearings 48 and 49, which straddle the worm 47, and bearing 50 support the shaft 46 which is turned by a handle 51. The worm 47 engages the worm gear 45, and to this end bearing 42 is provided with a slot 52 to avoid interference. Otherwise, bearing 42 may be similar to bearings 39, 40, and 41.

Figure 4:
Figure 4 is a diagrammatic illustration of some of the positions a V-shaped spring may take to adjust the deflection rate.

Figure 4 diagrammatically illustrates some of the positions the V-shaped springs 29 may take as the rate of deflection is adjusted. Assuming lines 53 to represent an initial setting, rotating the rod 15 clockwise produces a setting represented by the dotted lines 54, while, in contrast, rotating the rod counterclockwise results in a setting represented by the dot and dash lines 55. In either case, the angle between the legs 30 and 31 of the V-shaped spring is changed and therefore the lever arm of the spring is also changed. In the case of clockwise rotation, it will be noted that the lever arm of the spring has been increased since distance "$y$" is greater than distance "$x$." The spring in this position has less resistance to compression, and the seat therefore has a lower deflection rate. This is an adjustment normally preferred by a relatively light person. In the case of counterclockwise rotation, the lever arm has been decreased since distance "$z$" is shorter than distance "x." The seat now has a greater resistance to compression and a higher deflection rate. This is an adjustment normally preferred by a heavier person.

Instead of the sinuous-shaped springs 24, it is possible to use other resilient means such as coil springs, cushion springs, or the like, it being understood that the amount of compression in such resilient means for any desired deflection rate is regulated by adjusting the lever arm of a V-shaped spring as previously described.

While the foregoing disclosure describes a presently preferred embodiment, it is understood that the invention may be practiced in other forms within the scope of the following claims.

We claim:

1. A seat structure for a motor vehicle including a frame, a rod mounted for rotation on the frame and extending longitudinally thereof, resilient means supported by the frame comprising a plurality of sinuous-shaped wire springs fixed to the rear of the frame and extending toward the front, a plurality of V-shaped springs, each having one leg connected to a sinuous-shaped spring and the other leg fixed to the rod, and means to rotate the rod including a gear fixed to the rod, a shaft extending longitudinally of the frame and mounted thereon having a gear engageable with said first gear, and means accessible from beyond the frame for rotating the shaft whereby the lever arm of the V-shaped springs is adjusted to regulate the rate of deflection of the resilient means.

2. A seat structure for a motor vehicle having an adjustable deflection rate including a frame, a rod mounted on the frame for rotation about its own axis and extending longitudinally of the frame and adjacent the front thereof, resilient means supported by the frame comprising a plurality of sinuous-shaped wire springs fixed at one end to the rear of the frame and extending toward the front, a plurality of V-shaped springs, each having one leg connected to the forward end of a sinuous-shaped spring and the other leg fixed to the rod, and means to rotate the rod including a gear fixed to the rod, a shaft extending longitudinally of the frame and mounted thereon for rotation having a gear engageable with the gear on the rod, a second gear on the shaft, a second shaft mounted on the frame for rotation and extending beyond the frame, a gear on the second shaft engageable with said second gear, and means to turn said second shaft whereby the lever arm of the V-shaped springs is adjusted to regulate the rate of deflection of the resilient means.

3. A seat comprising a frame, a member mounted for rotation on the frame and extending longitudinally thereof, resilient means supported by the frame comprising a plurality of transversely spaced springs connected to the rear of the frame and extending toward the front thereof and terminating in downwardly disposed V-shaped springs, the lower ends of the lower legs of said V-shaped springs being fixed to said member, and means for rotating said member to vary the angle between the legs of said V-shaped springs, whereby the lever arm of said springs is adjusted to regulate the rate of deflection of the resilient means.

References Cited in the file of this patent

UNITED STATES PATENTS

| | | |
|---|---|---|
| 1,278,730 | Oliver | Sept. 10, 1918 |
| 1,777,463 | Dearing | Oct. 7, 1930 |
| 2,049,550 | Van Dresser et al. | Aug. 4, 1936 |
| 2,087,254 | Herold | July 20, 1937 |
| 2,266,092 | Springer | Dec. 16, 1941 |
| 2,548,066 | Rivera | Apr. 10, 1951 |
| 2,630,585 | Reese | Mar. 10, 1953 |
| 2,633,903 | Tsang | Apr. 7, 1953 |

FOREIGN PATENTS

| | | |
|---|---|---|
| 6,001 | Germany | Dec. 15, 1878 |
| 13,849 | Great Britain | 1912 |